United States Patent [19]

Callaghan et al.

[11] 4,194,720
[45] Mar. 25, 1980

[54] TRANSMISSION CONTROL

[75] Inventors: William I. Callaghan, Mentor; Dennis E. Dawson, Highland Heights; William D. Gubser, Mentor; Joseph A. Vero, Shaker Heights, all of Ohio

[73] Assignee: Towmotor Corporation, Mentor, Ohio

[21] Appl. No.: 810,346

[22] Filed: Jun. 27, 1977

[51] Int. Cl.² .............................................. F16K 31/62
[52] U.S. Cl. ......................................... 251/77; 74/478; 74/491; 74/512; 192/85 R; 251/294; 251/295
[58] Field of Search ............ 74/512, 478, 491, 501 R; 192/85 R, 99 S, 99 R; 251/77, 78, 279, 294, 295

[56] References Cited

U.S. PATENT DOCUMENTS

| 1,647,839 | 11/1927 | Moorhouse | 74/801 |
|---|---|---|---|
| 1,810,103 | 6/1931 | Flagstad | 74/512 |
| 1,966,768 | 7/1934 | Shreffler et al. | 74/512 |
| 2,055,255 | 9/1936 | Hopkins | 192/0.052 |
| 2,068,962 | 1/1937 | Sanford | 74/512 |
| 2,080,632 | 5/1937 | Pohle | 192/4 A |
| 2,104,455 | 1/1938 | Ford | 192/0.072 |
| 2,113,915 | 4/1938 | Freeman | 192/4 A |
| 2,228,393 | 1/1941 | Leaming | 251/295 |
| 2,280,002 | 4/1942 | Neracher | 192/0.052 |
| 2,370,859 | 3/1945 | Hale | 192/85 R |
| 2,774,376 | 12/1956 | Young | 251/295 |
| 3,286,803 | 11/1966 | Zeidler | 192/99 S |
| 3,292,752 | 12/1966 | Schuster et al. | 192/4 A |
| 3,365,042 | 1/1968 | Smirl et al. | 192/99 S |
| 3,498,433 | 3/1970 | Lohmann | 74/512 |
| 3,757,612 | 9/1973 | Schaefer | 251/294 |
| 3,769,852 | 11/1973 | Peifer et al. | 74/512 |
| 3,878,738 | 4/1975 | Brooke | 251/294 X |
| 4,002,084 | 1/1977 | Martins | 74/512 |
| 4,064,769 | 12/1977 | Amdall et al. | 74/512 |
| 4,067,426 | 1/1978 | Murphy | 74/512 |

FOREIGN PATENT DOCUMENTS

| D 19722 | 12/1955 | Fed. Rep. of Germany | 192/99 S |
|---|---|---|---|
| 616900 | 1/1949 | United Kingdom | 192/85 R |

Primary Examiner—Martin P. Schwadron
Assistant Examiner—G. L. Walton
Attorney, Agent, or Firm—James R. Bell

[57] ABSTRACT

A transmission control for a motor vehicle includes a valve and a spool mounted in the valve biased to extend therefrom. A spool actuator member controls extension of the spool from the valve. A spool control member is connected to move in response to movement of an operator control. An adjustable engaging member on the spool control member moves a predetermined distance free of forced engagement with the spool actuator. Subsequently the engaging member engages and moves the spool actuating member.

7 Claims, 3 Drawing Figures

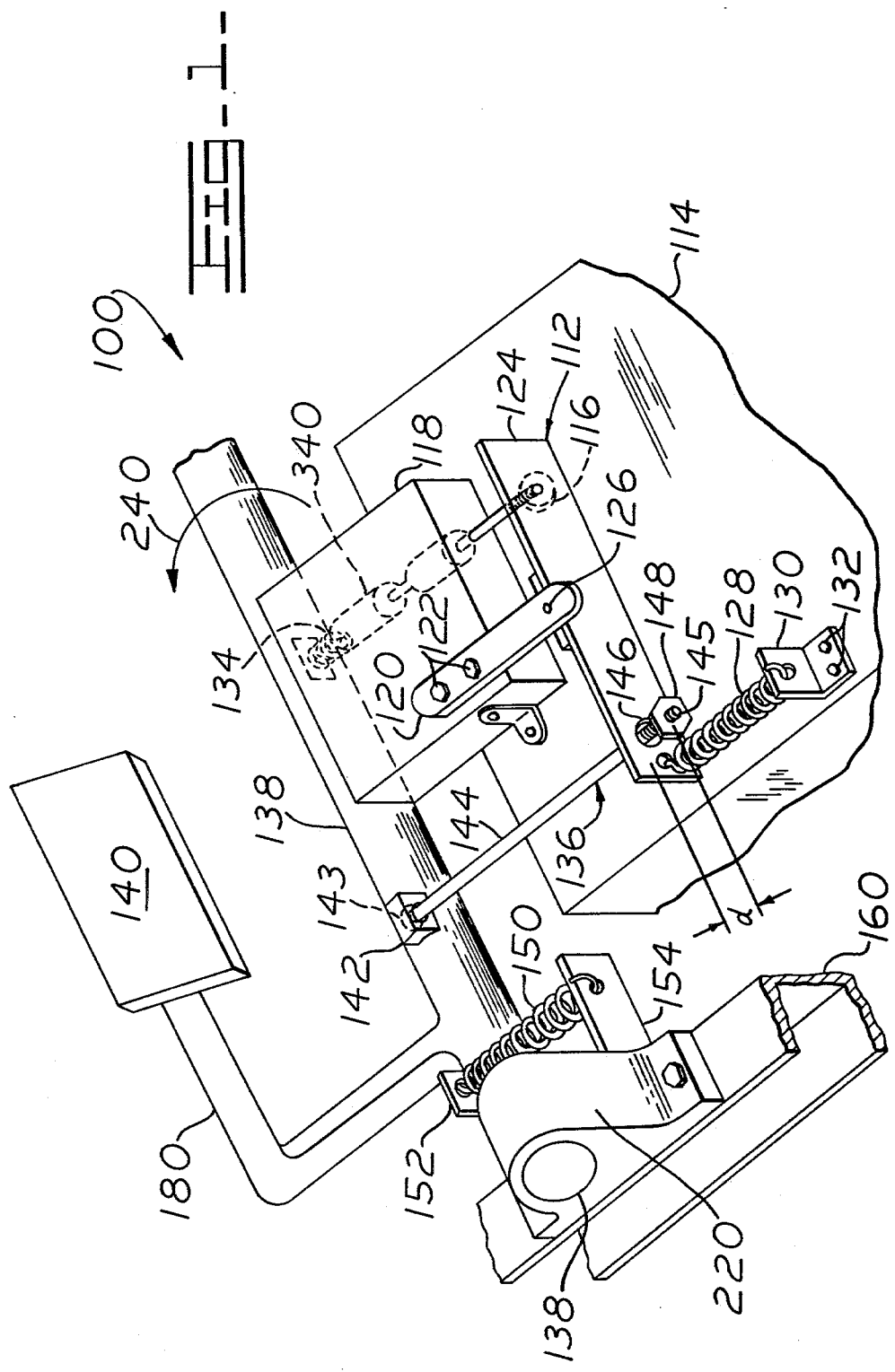

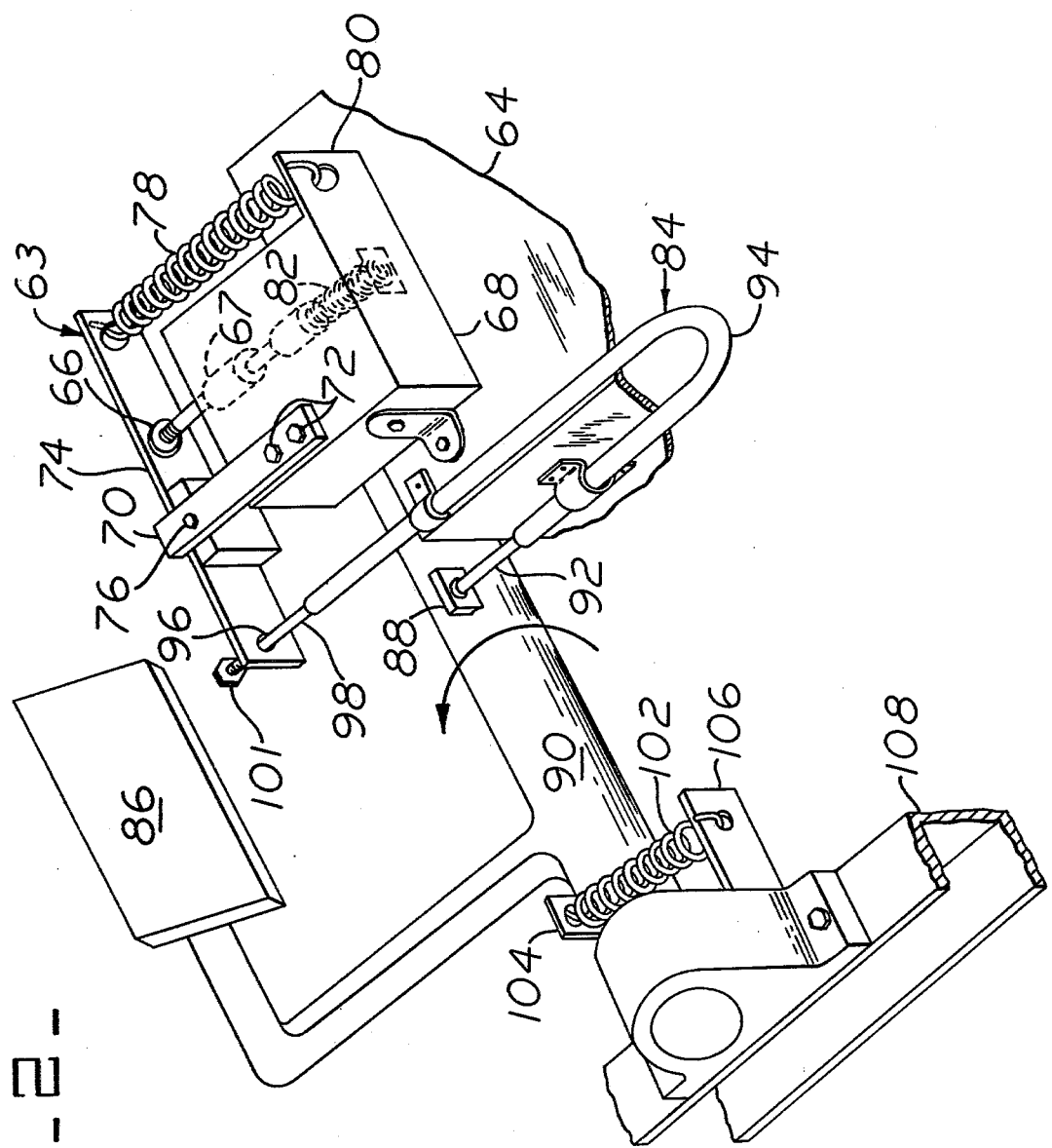

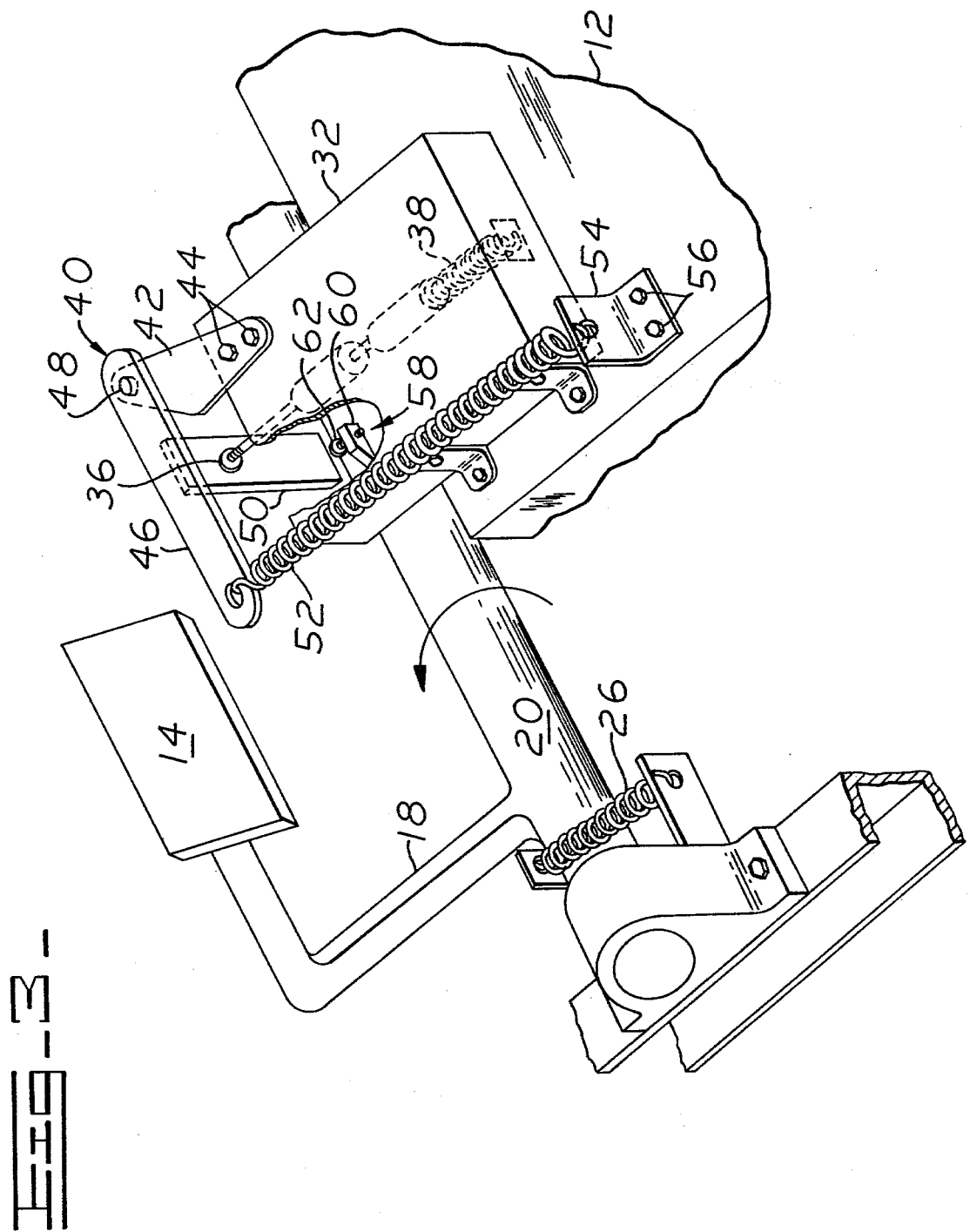

TRANSMISSION CONTROL

BACKGROUND OF THE INVENTION

1. Field of the Invention

This invention relates generally to clutches and power stop controls and more particularly to those of the clutch and brake type.

2. Description of the Prior Art

In vehicles having transmissions with hydraulically actuated clutches, the prior art has recognized the problem of vehicle operators resting a foot on a clutch pedal. The resulting force causes movement of the clutch and some clutch slippage.

As a result, the prior art has provided an inching control device which tolerates some clutch linkage movement without resulting clutch slippage.

A problem with this type of prior art device is that a spring is biased to provide constant forced engagement between the clutch pedal and the vehicle transmission. Significant vibration within the vehicle drive train is therefore transmitted through the clutch pedal to the operator's foot. Such vibration is both annoying and tiresome to the operator.

In view of the above, it would be advantageous to provide an inching control which tolerates some linkage movement without causing uncontrolled slippage and also which avoids transmitting substantial vibration from the vehicle drive train to the operator.

It is recognized that the above-mentioned problems associated with vehicles having transmissions with hydraulic actuating clutches can be related to similar problems of uncontrolled pump displacement and vibration in vehicles having hydrostatic transmissions.

SUMMARY OF THE INVENTION

The present invention is directed to overcoming one or more of the problems as set forth above.

According to the present invention this is accomplished by providing a transmission control for a motor vehicle including a valve mounted on the vehicle. A spool is mounted in the valve and biased to extend therefrom.

A spool actuator member is mounted on the vehicle in engagement with the spool for controlling extension of the spool from the valve.

An operator control is movably mounted on the vehicle and a spool control member is connected to move in response to movement of the operator control. An adjustable engaging member, on the spool control member, moves a predetermined distance, free of forced engagement with the spool actuator. Subsequently, the engaging member engages and moves the spool actuator for permitting movement of the spool.

The foregoing and other advantages will become apparent from the following detailed description of the invention when considered in conjunction with the accompanying drawings. It is to be expressly understood, however, that the drawings are not intended as a definition of the invention but are for the purpose of illustration only.

BRIEF DESCRIPTION OF THE DRAWINGS

In the drawings:

FIG. 1 is a graphical illustration of the preferred embodiment of this invention;

FIG. 2 is a graphical illustration of an alternative embodiment of this invention; and FIG. 3 is a graphical illustration of another alternative embodiment of this invention.

DETAILED DESCRIPTION

A transmission inching control device is generally designated 100 in FIG. 1. A vehicle drive train includes a transmission 114 which, as it is well known, is mounted on the vehicle through resilient or other mounting devices for the purpose of damping vibration which would otherwise be transmitted from the drive train to other portions of the vehicle.

Preferably, an operator control such as clutch pedal 140 is generally mounted on a portion of the vehicle frame 160 through arm 180. The arm 180 is preferably welded to a shaft 138 which is pivotally mounted to frame 160 via bearing mount 220. Force applied to clutch pedal 140 causes shaft 138 to rotate in the direction indicated by an arrow designated 240, in the well known manner. Although the operator control is illustrated as a foot-operated clutch pedal 140, it is recognized that a hand-operated lever may be used if desired.

When force is removed from pedal 140, the shaft 138 tends to return to stop at its normal at rest position, as shown in FIG. 1, due to the force of return spring 150 tensioned between tab 152 on shaft 138 and extension 154 connected to frame 160, as is well known.

A control valve such as transmission creep valve 118 is operably connected to transmission 114 for controlling engagement and disengagement of the clutch. A valve spool 340 including spool follower 116 is mounted in valve 118 and biased to extend therefrom due to compression spring 134 mounted in valve 118 in the well known manner.

A unique feature of this invention is a spool actuator portion, generally designated 112, movably mounted on transmission 114 in engagement with follower 116 for controlling extension of follower 116 from valve 118, see FIG. 1.

This is accomplished by providing spool actuator portion 112 to preferably include a support member 120 fixedly attached to valve 118 by bolts 122. A spool actuator member 124 is pivotally connected, at pin 126, to support 120.

Spool actuator member 124 is positioned to be in engagement with follower 116. Spring 128 is connected to actuator member 124 and to tab 130 mounted on transmission 114 by bolts 132, or the like, for the purpose of resiliently biasing actuator member 124 into engagement with follower 116 to resist pivotal movement of member 124 about pin 126. It is therefore necessary that spring 128 provide a force acting on member 124 which is sufficient to overcome the force of spring 134 tending to urge follower 116 outwardly from valve 118 against member 124.

A control portion, generally designated 136, is connected to pivotal shaft 138 in fixed relationship with pedal 140. This is accomplished by providing a tab 142 preferably welded or otherwise fixedly connected to shaft 138 so as to be in fixed relationship with pedal 140. A rod 144 connects tab 142 and member 124. Rod 144 is preferably pivotally connected to tab 142 at its one end 143 such as by a ball and socket or the like and extends through enlarged opening 146 of member 124 at its other end 145.

The other end of rod 144 is preferably threaded to accommodate an adjustable engaging follower, preferably such as nut 148, or the like. Nut 148, larger in diameter than opening 146, is spaced from member 124 a predetermined distance d. Also, since nut 148 is threaded on rod 144, the nut provides an adjustable stop for varying the predetermined distance. Since nut 148 is spaced from member 124, and since rod 144 passes through opening 146 substantially out of contact with member 74, two desired results are achieved. This is, spring 150, tensioned between fixed tab 152 on shaft 138 and extension 154 on frame portion 156, biases nut 148 of control portion 136 out of forced engagement with member 124 so that there is a substantial reduction in the magnitude of the undesirable vibrations carried from the vehicle drive train to clutch pedal 140 through rod 136, and second, nut 148 can move, in response to movement of pedal 140, toward member 124, a predetermined distance free of forced engagement with spool actuator member 124. Subsequently, upon further movement of pedal 140, nut 148 can forcibly engage member 124 and cause pivotal movement thereof for permitting outward movement of follower 116 from valve 118. If desired, nut 148 can include an arcuate face for engagement with member 124. It is recognized that the predetermined distance d can be varied by adjustably mounting follower 116 on spool 340. Preferably this is accomplished by threadably mounting follower 116 on spool 340.

When spring 150 is biasing nut 148 out of forced engagement with member 124, rod 144 may touch, contact or rest against opening 146. However, this is not considered to be forced engagement which would transmit noticeable vibrations from member 124 through rod 144 to pedal 140. Rather, this is considered to be "at rest" engagement which causes little, if any, vibration to be carried through rod 144.

Support 120 and actuator member 124 are preferably of a suitable fabricated steel material. Tab 130 may preferably be a piece of angle iron if desired. Bolts 122,132 are preferably of a commercially available type as are springs 128,150. All of the above-mentioned parts are of noncritical material for the purposes of this invention and may be varied if desired.

As an alternative, FIG. 2 illustrates that a spool actuator portion, generally designated 63, is movably mounted on transmission 64 in engagement with follower 66 of spool 67 for controlling extension of spool 67 and follower 66 from valve 68.

This is accomplished by providing spool actuator portion 63 to preferably include a support member 70 fixedly attached to valve 68 by bolts 72. A spool actuator member 74 is pivotally connected, at pin 76, to support 70.

Spool actuator member 74 is positioned to be in engagement with follower 66. Spring 78 is connected to actuator member 74 and to tab 80 connected to valve 68, such as by welding or the like, for the purpose of resiliently biasing actuator member 74 into engagement with follower 66 to resist pivotal movement of member 74 about pin 76. It is therefore necessary that spring 78 provide a force acting on member 74 which is sufficient to overcome the force of spring 82 tending to urge spool 67 and follower 66 outwardly from valve 68 against member 74.

A spool control portion, generally designated 84, is connected to pivotal shaft 90 in fixed relationship with operator control or pedal 86. This is accomplished by providing a tab 88 preferably welded or otherwise fixedly connected to shaft 90 so as to be fixed in relationship with pedal 86. A cable 92 connects tab 88 and member 74. Cable 92 is preferably pivotally connected to tab 88 at one end and is guided through a substantially rigid preformed sheath 94.

An extension 98, at the other end of cable 92, extends through an enlarged opening 96 in member 74. Extension 98 is threaded to accommodate an adjustable engaging means such as correspondingly threaded nut 101, or the like. Nut 101, larger in diameter than opening 96, is spaced from member 74 a predetermined distance. Also, since nut 101 is threaded on extension 98, the nut provides an adjustable stop for varying the predetermined distance. Since nut 101 is spaced from member 74, and since extension 98 passes through opening 96 substantially out of contact with member 74, the above-mentioned desired results are achieved in the alternative of FIG. 2. That is, spring 102, tensioned between fixed tab 104 on shaft 90 and extension 106 on frame portion 108, biases nut 101 of control portion 84 out of forced engagement with member 74 so that there is a substantial reduction in the magnitude of the undesirable vibrations carried from the vehicle drive train to the clutch pedal 86 through cable 92, and second, nut 101 can move, in response to movement of pedal 86, toward member 74, a predetermined distance free of engagement with spool actuator member 74. Subsequently, upon further movement of pedal 86, nut 101 can engage member 74 and cause pivotal movement thereof for permitting outward movement of follower 66 from valve 80.

As another alternative, FIG. 3 illustrates that a spool actuator portion generally designated 40 and movably mounted on transmission 12 in engagement with follower 36 of spool 35 for controlling extension of spool 35 and follower 36 from valve 32.

This is accomplished by providing spool actuator portion 40 to preferably include a support member 42 fixedly attached to valve 32 by bolts 44. A spool actuator member 46 is pivotally connected, at pin 48, to support 42. A portion 50 of actuator member 46 can be formed with member 46 as a unit but, preferably, portion 50 is a separate piece welded to member 46.

Portion 50 extends downwardly, as shown in FIG. 1, from member 46 so as to be positioned into engagement with follower 36. Spring 52 is connected to actuator member 46 and to tab 54 bolted to transmission 12 by bolts 56, for the purpose of resiliently biasing actuator member 46 into engagement with follower 36 to resist pivotal movement of member 46 about pin 48. It is therefore necessary that spring 52 provide a force acting on member 46 which is sufficient to overcome the force of spring 38 tending to urge spool 35 and follower 36 outwardly from valve 32 against portion 50.

A spool control portion, generally designated 58, is mounted on pivotal shaft 20 in fixed relationship with operator control or pedal 14. This is accomplished by providing a tab 60 preferably welded on shaft 20 so as to be fixed in relationship with pedal 14. Tab 60 is attached to shaft 20 in such a manner so that when pedal 14 is at rest, tab 60 is spaced at some predetermined distance so as to be displaced from, and out of contact with, portion 50.

An adjustable engaging means such as a bolt 62, or the like, can be threaded into tab 60 for varying the predetermined distance between tab 60 and portion 50. Since the position of tab 60 on shaft 20 is in fixed displacement relative to arm 18, the above-mentioned two desired results are achieved. First, spring 26 biases control portion 58 out of forced engagement with portion 50 so that there is a substantial reduction in the magnitude of the undesirable vibrations carried from the vehicle drive train to the clutch pedal 14 through portion 58, and second, bolt 62 can move, in response to movement of pedal 14, a predetermined distance free of engagement with spool actuator 46. Subsequently, upon further movement of pedal 14, bolt 62 can engage portion 50 of spool actuator 46 and cause pivotal movement thereof for permitting outward movement of follower 36 from valve 32.

In operation, with the parts interconnected as hereinabove described, it can be seen that force applied to pedal 140 pivots shaft 138 in the direction of arrow 240 against the opposed force of return spring 150. Rod 144 moves accordingly and adjustable nut 148 moves a predetermined distance before forcibly engaging actuator member 124. Once forced engagement occurs, member 124 is pivoted about pin 126 and follower 116 is permitted to move outwardly from valve 118 in engagement with member 124 for permitting some clutch slippage.

After force is removed from pedal 140, return spring 150 returns pedal 140 to its at rest position and nut 148 is disengaged from member 124. Thus, member 124 pivots about pin 126 urging follower 116 and spool 340 back into valve 118 for fully engaging the clutch.

The foregoing has described a transmission control for a motor vehicle having a spool control member connected to move in response to movement of an operator control such as a vehicle pedal. An associated spool actuator controls a spool follower. Initially, the spool control member moves in response to movement of the pedal. Subsequently, an adjustable engaging member on the control member forcibly engages and moves the spool actuator for permitting movement of the spool and follower.

The embodiments of the invention in which an exclusive property or privilege is claimed are defined as follows:

1. A transmission control for a motor vehicle, comprising:
   a control valve on the vehicle;
   a spool mounted in the valve;
   a support member attached to the valve;
   a spool actuator member pivotally connected to the support member;
   first resilient means for urging the spool into contact with the spool actuator member;
   second resilient means for urging the actuator member into contact with the spool in opposition to the first resilient means;
   an operator control movably mounted on the vehicle;
   spool control means for movement in response to movement of the operator control a predetermined distance, free of forced engagement with the spool actuator means and subsequently for forcibly engaging and moving the spool actuator means for permitting movement of the spool, said spool control means is positioned between said operator control and said spool actuator member; and
   means for adjusting the predetermined distance.

2. The control of claim 1, wherein the spool control means comprises:
   a control member connected to the operator control and extending therefrom through the spool actuator member.

3. The control of claim 1, wherein the spool control means comprises:
   a cable connected to the operator control and extending therefrom through the spool actuator member.

4. The control of claim 1, wherein the spool control means comprises:
   a control member pivotally mounted on the vehicle in fixed relationship with the operator control.

5. The control of claim 1, wherein:
   the means for adjusting the predetermined distance includes a follower adjustably mounted on the spool.

6. The control of claim 1, wherein:
   the means for adjusting the predetermined distance includes a follower adjustably mounted on the spool control means.

7. A vehicle, comprising:
   a transmission control including a control valve;
   a spool biased to extend from the control valve;
   spool actuator means for controlling extension of the spool from the valve, said spool actuator means including:
   a support member mounted on the valve and;
   a spool actuator member pivotally connected to the support member, said spool actuator member being resiliently biased into engagement with the spool to resist pivotal movement;
   first resilient means for urging the spool into contact with the spool actuator member;
   second resilient means for urging the actuator member into contact with the spool in opposition to the first resilient means;
   an operator control;
   spool control means for movement in response to movement of the operator control a predetermined distance, free of forced engagement with the spool actuator means and subsequently for forcibly engaging and moving the spool actuator means for permitting movement of the spool, said spool control means is positioned between said operator control and said spool actuator member; and
   means for adjusting the predetermined distance.

* * * * *